(12) United States Patent
Chen et al.

(10) Patent No.: US 6,516,534 B2
(45) Date of Patent: Feb. 11, 2003

(54) MEASURABLE GUIDE ACTUATOR

(75) Inventors: Tung-Hsing Chen, Taichung (TW); Ching-Shan Wu, Miao-Li Hsien (TW)

(73) Assignee: Hiwin Technologies Corp., Taichung City (TW)

( * ) Notice: Subject to any disclaimer, the term of this patent is extended or adjusted under 35 U.S.C. 154(b) by 0 days.

(21) Appl. No.: 09/848,659

(22) Filed: May 4, 2001

(65) Prior Publication Data

US 2002/0162241 A1 Nov. 7, 2002

(51) Int. Cl.[7] .................................................. G01B 3/00
(52) U.S. Cl. ............................................ 33/706; 33/710
(58) Field of Search .............................. 33/706–8, 710, 33/DIG. 1

(56) References Cited

U.S. PATENT DOCUMENTS

| | | | | |
|---|---|---|---|---|
| 2,862,410 A | * | 12/1958 | Meyer | 33/710 |
| 4,838,696 A | * | 6/1989 | Pryor | 33/707 |
| 4,908,953 A | * | 3/1990 | Wallisser | 33/706 |
| 5,402,691 A | * | 4/1995 | Dworkokski et al. | 33/1 M |
| 5,488,782 A | * | 2/1996 | Ochiai | 33/708 |
| 5,699,621 A | * | 12/1997 | Trumper et al. | 33/DIG. 1 |
| 5,716,071 A | * | 2/1998 | Stanley et al. | 33/708 |
| 5,842,283 A | * | 12/1998 | Yatsu et al. | 33/706 |
| 5,987,768 A | * | 11/1999 | Freitag et al. | 33/706 |

FOREIGN PATENT DOCUMENTS

| | | | | |
|---|---|---|---|---|
| GB | 2160977 | * | 1/1986 | 33/706 |
| IT | 0314940 A1 | * | 8/1988 | 33/707 |
| JP | 62185109 | * | 8/1987 | 33/706 |
| JP | 63067513 | * | 3/1988 | 33/706 |
| JP | 03039614 A1 | * | 7/1989 | 33/706 |

* cited by examiner

*Primary Examiner*—Diego Gutierrez
*Assistant Examiner*—Travis Reis
(74) *Attorney, Agent, or Firm*—Charles E. Baxley

(57) ABSTRACT

A measurable guide actuator is used to integrate a driving mechanism, a guide mechanism, and a position measuring member so as to form an integral simplifying construction, thereby facilitating the usage and thereby reducing consumption of material. The measurable guide actuator of the present invention uses a U-shaped guide track to function as the guide mechanism. The driving mechanism uses a screw or a belt. The position measuring member includes a ruler body mounted in the guide mechanism, and a reading head sealed in the sliding table to slide therewith so that the position measuring member can be used to measure the displacement position values.

5 Claims, 5 Drawing Sheets

MEASURABLE GUIDE ACTUATOR

BACKGROUND OF THE INVENTION

1. Field of the Invention

The present invention relates to a guide actuator, and more particularly to a measurable guide actuator suitable for an electronic equipment, robot, automatic machine or the like.

2. Description of the Related Prior Art

A guide actuator consists of a base, a sliding table, a driving mechanism, guide mechanism, and a motor. The conventional design used the linear guide way as guide mechanism. A pair of parallel rails of the linear guide ways is mounted on the base, then the sliding table mount on the sliders of the linear guide ways, and the driving mechanism transfers the rotational movement provided by the motor into a linear movement for driving the sliding table to move. The mechanism is complicated, and made more cost. For reducing the cost of machining, the materials of the base and guide mechanism can used by the aluminum extrusion for the mass production, but the rigidity of aluminum is smaller, thus causing the linear and parallel accuracy being worse under the condition of heavy load, so that the positioning precision of the guide actuator is not good.

The driving of the guide actuator may use a screw or a belt. The screw usually uses a ball screw or ACME screw, and the belt usually uses a timing belt for obtaining a better driving motion. The different driving methods result in the different accuracy and velocity of the guiding table. The use of ball screw has the best precision due to the feature of low backlash, and the timing belt due to a worse accuracy because the rubber has flexibility. Under the consideration of velocity, the timing belt has the maximum driving velocity. Under the consideration of cost, the ACME screw has the lowest cost, but the precision and velocity thereof are much worse than that of the ball screw. The guide mechanism of the guide actuator is mainly constituted by a pair of linear guide way. The motor includes a step motor or a servo motor. When the guide actuator is mounted on the machine table equipment, the position of the sliding table is indirectly calculated by the angle of rotation of the motor, which easily causes errors.

In general, the guide actuator does not include directly a position detecting function. Some mechanism mounts an encoder on the motor or the screw shaft, but when the motor drives the screw or the belt wheel to rotate, the control system can only detect the angle of rotation of the motor or the screw shaft, and cannot detect the exact position of the sliding table. If it is needed to detect the exact position of the sliding table, the only conventional method is to additionally install a position scale on the outside of the mechanism after the guide actuator is installed on the equipment. Thus, this method needs to additionally increase the space and time of installation, thereby increasing the consumption of material and the requirements of technology of installation, while the space of the mechanism and the cost of fabrication are also increased.

SUMMARY OF THE INVENTION

The primary objective of the present invention is to provide a measurable guide actuator containing a position sensing function therein and having an excellent structural strength without increasing the existing space of construction so as to solve the problems encountered by the conventional guide actuator in which the position of the sliding table of the conventional guide actuator cannot be feedback or the feedback values are incorrect, and to solve the drawbacks in which the conventional guide actuator has a complicated construction and has a high cost of fabrication.

The guide mechanism of the present invention is constructed to have a U-shaped structure which has a great structural inertia moment for providing the measurable guide actuator with an excellent structural rigidity. The U-shaped guide mechanism defines a first groove, and the sliding table defines a second groove mating with the first groove of the U-shaped guide mechanism. A plurality of balls are inserted between the first groove of the U-shaped guide mechanism and the second groove of the sliding table so that the sliding table can be moved relative to the U-shaped guide mechanism by rolling of the balls.

The ruler body of the position measuring member is bonded on the bottom face of the U-shaped guide mechanism, and the sensor of the position measuring member is attached on the sliding table so that the sliding table is integral with the magnetic sensor, thereby saving the space.

In driving, the driving mechanism includes a ball screw or ACME screw extending through the sliding table, and the thread is directly provided on the sliding table to mate with that of the screw. The ball screw needs a circulation channel for the balls, and the ball circulation channel is also provided on the sliding table, thereby saving the space. When the screw is rotated, the thread of the screw will drive the sliding table to move.

When the system is driven by a belt, a timing belt is reeved around the top and bottom faces of the sliding table and is stretched and supported by two belt wheels. When a motor is rotated, the timing belt is driven by the belt wheels to move the sliding table.

The magnetic scale can be used to directly measure the displacement position so as to compensate the precision of the ball screw, the ACME screw or the timing belt. In addition, the driving, guidance and measurement are integrally designed, thereby simplifying the construction and saving cost of fabrication.

In addition, the magnetic scale may also be replaced by a optical scale. A steel strap type optical ruler body is integrally bonded in the inner side of the middle of the U-shaped guide mechanism while the reading sensor is sealed in the sliding table, thereby obtaining more precise signal.

Further benefits and advantages of the present invention will become apparent after a careful reading of the detailed description with appropriate reference to the accompanying drawings.

DETAILED DESCRIPTION OF THE INVENTION

Figure 1:
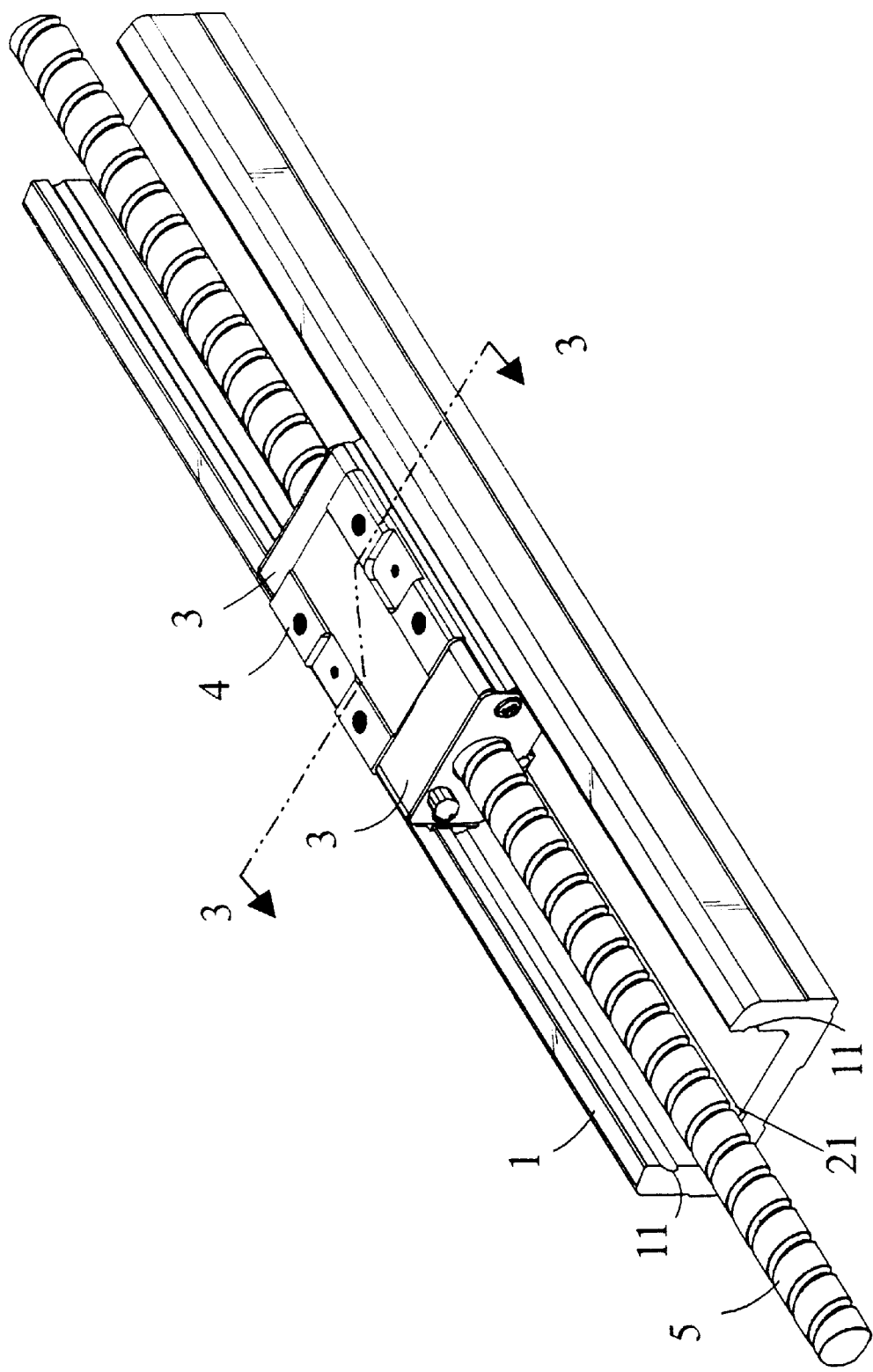
FIG. 1 is perspective view of a measurable guide actuator in accordance with a first embodiment of the present invention.
Figure 2:
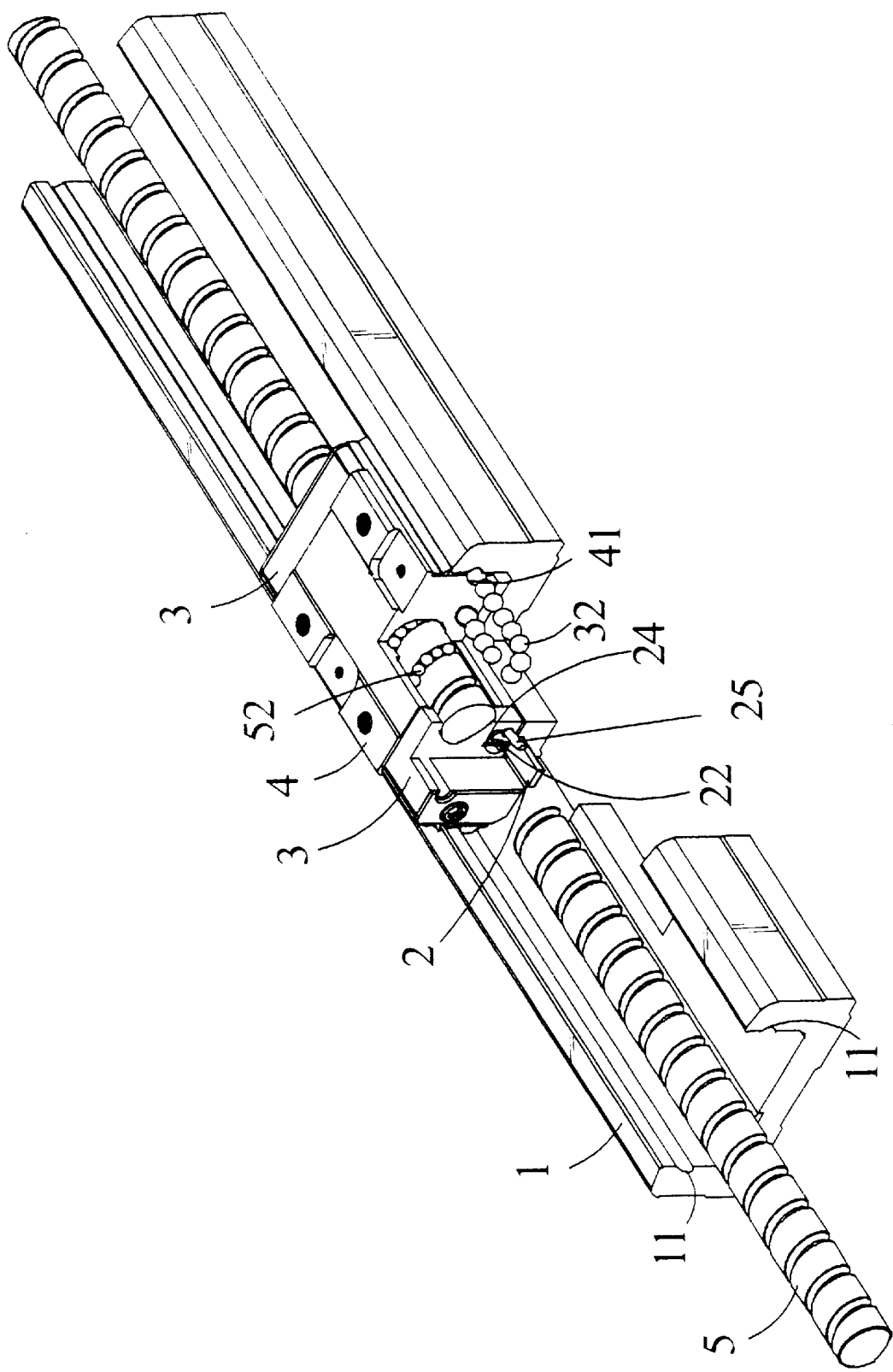
FIG. 2 is a partially cut-away view of the measurable guide actuator as shown in FIG. 1.
Figure 3:
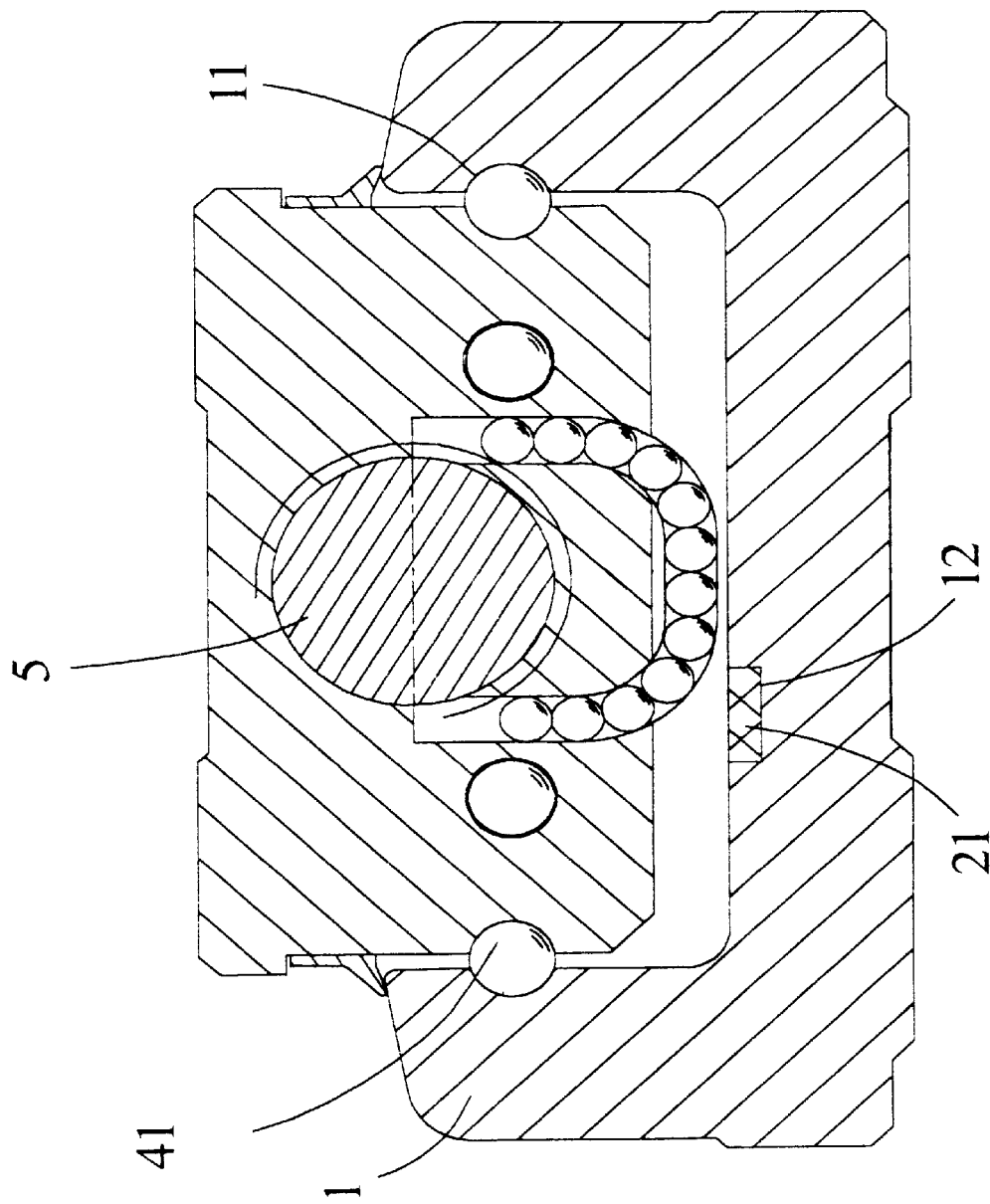
FIG. 3 is a side plan cross-sectional view of the measurable guide actuator along line A–A' as shown in FIG. 1.

Referring to the drawings and initially to FIGS. 1–3, a measurable guide actuator in accordance with a first embodiment of the present invention essentially comprises a guide mechanism 1, a sliding table 4, a driving mechanism, and a position measuring member.

The driving mechanism is used to provide a power for the sliding movement of the sliding table 4. The driving mechanism may be a ball screw 5, and the sliding table 4 is provided with a thread mating with that of the ball screw 5. Alternatively, the driving mechanism may be an ACME screw, and the sliding table 4 is provided with a thread mating with that of the ACME screw. The ball screw 5 as shown in FIGS. 1–3 can be used to transform the power of positive rotation or reverse rotation into the power of a linear movement of the measurable guide actuator so that the sliding table 4 can slide on the guide mechanism 1.

The guide mechanism 1 is elongated with a substantially U-shaped cross-section for guiding the sliding table 4 to move along a linear track. The position measuring member has a ruler body mounted on an inner side of the U-shaped guide mechanism 1 such that the position measuring member has a function of detecting the position of the sliding table 4. The position measuring member may be a magnetic scale 2 which is used to feedback the movement positions of the measurable guide actuator. All of the above-mentioned parts are entirely integrated in the guide mechanism 1 of a U-shaped structure, thereby forming a design of saving space.

For simplifying the space of the structure, the U-shaped guide mechanism 1 has two sides each having an inner wall defining an elongated first groove 11. The sliding table 4 is slidably mounted between the two sides of the U-shaped guide mechanism 1, and has two sides each defining a second groove 41 mating with the elongated first groove 11 of the U-shaped guide mechanism 1. A plurality of balls 32 are inserted between the elongated first groove 11 of the U-shaped guide mechanism 1 and the second groove 41 of the sliding table 4. The sliding table 4 has a front end and a rear end each provided with an end cap 3 for allowing circulating rolling of the balls 32 so that the sliding table 4 can move along the elongated first groove 11 of the U-shaped guide mechanism 1. The grooves 11 and 41 can be treated by a finishing process such as a grinding process so as to obtain a great working precision so that the measurable guide actuator in accordance with the present invention can obtain an excellent parallel and linear accuracy. The U-shaped guide mechanism 1 has a rigid structure. The whole measurable guide actuator can be directly locked on the working table, thereby facilitating employing it.

The sliding table 4 is directly machined to have a thread mating with that of the screw 5 for allowing passage of the screw 5. When the screw is a ball screw, the circulating channel of the balls of the nut is directly mounted in the sliding tables 4 for allowing circulating movement of the balls 52, thereby saving space.

The guide mechanism 1 has a recess 12 defined in the mediate inner side thereof. The magnetic scale 2 includes a ruler body 21 mounted on the bottom face of the inner side of the U-shaped guide mechanism 1 and received in the recess 12, and a magnetic resistance sensor 22 fixed and sealed in the end cap 3 located at one side of the sliding table 4. The magnetic resistance sensor 22 is connected to a small sheet of printed circuit board 24 and a signal wire 25. The signal wire 25 has a first end connected to the connecting leg of the printed circuit board 24, and a second end mounted in one side of the end cap 3. The end cap 3 may be manufactured by a plastic injection or a metallic machining process, and the inner side of the end cap 3 is molded to have a space for allowing installation of the magnetic resistance sensor 22, the printed circuit board 24, and the signal wire 25. This design facilitates controlling the clearance defined between the magnetic resistance sensor 22 and the ruler body 21 so that the magnetic scale 2 can be adapted to have an excellent capacity of displacement measuring. The magnetic resistance sensor 22 is integrally formed with the end cap 3, thereby reducing the volume and material of measurable guide actuator.

Figure 4:
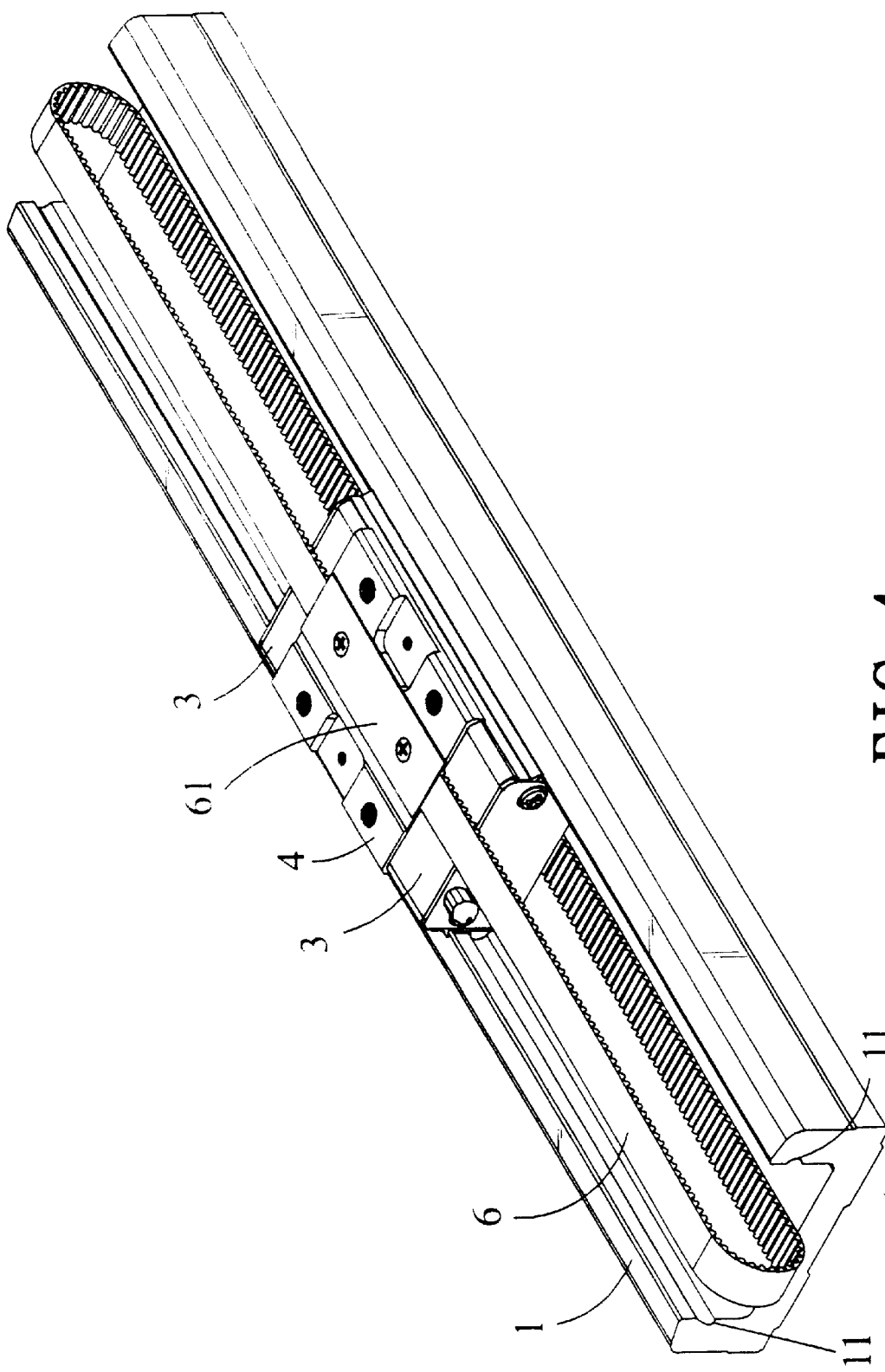
FIG. 4 is a perspective view of a measurable guide actuator in accordance with a second embodiment of the present invention.
Figure 5:
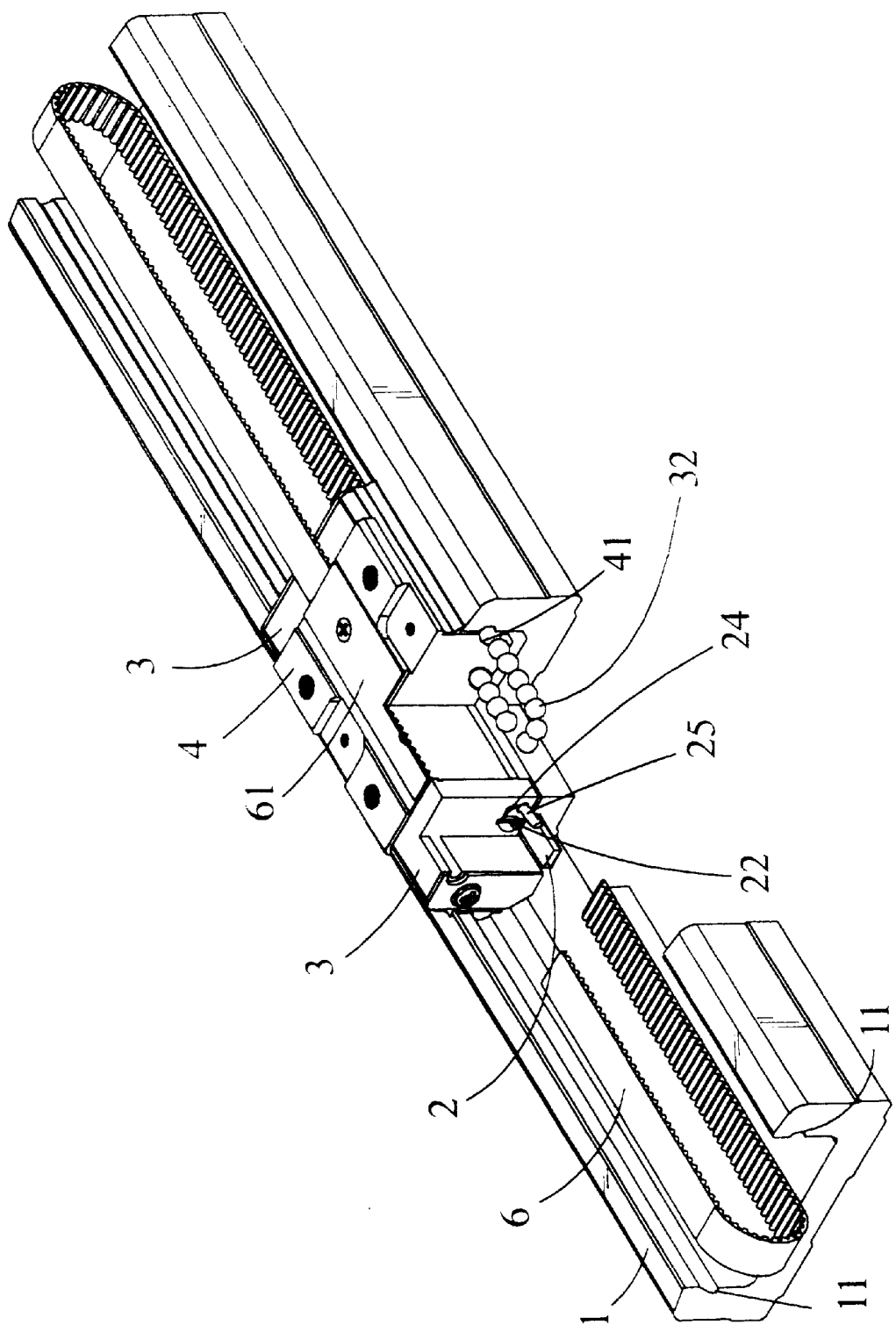
FIG. 5 is a partially cut-away view of the measurable guide actuator as shown in FIG. 4.

Referring to FIGS. 4 and 5, in accordance with a second embodiment of the present invention, the driving mechanism of the measurable guide actuator is a timing belt 6. One side of the timing belt 6 is fixed on the sliding table 4 by a press board 61, and the other side of the timing belt 6 freely passes through the bottom of the sliding table 4. A front belt wheel (not shown) and a rear belt wheel (not shown) co-operate with the timing belt 6 to support a capsule shaped structure, and are driven by a motor (not shown) to drive the timing belt 6 to rotate and to drive the sliding table 4 to move backward and forward. Meanwhile, the magnetic resistance sensor 22 of the magnetic scale 2 mounted on the sliding table 4 is moved relative to the ruler body 21 of the magnetic scale 2 bonded on the bottom face of the inner side of the U-shaped guide mechanism 1 so as to perform a function for detecting the position of the sliding table 4 in a positioning manner at a high speed. By means of the high velocity of the timing belt 6 and the position measurement of the magnetic scale 2, the measurable guide actuator of a timing belt can be used for transportation at a high speed, and has an excellent positioning precision.

The magnetic scale can be replaced by an optical scale which is more expensive than the magnetic scale but has a more precise measuring effect. Meanwhile, a steel strap optical ruler body is bonded in the recess 12 defined in the bottom face of the inner side of the U-shaped guide mechanism 1 while an optical interference type of reading head and an L.E.D. light source are fixed in the end cap 3 of the sliding table 4, thereby increasing the convenience, saving the space, and obtaining precision position values.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A measurable guide actuator comprising: a guide mechanism (1), a sliding table (4), a driving mechanism, and a position measuring member, wherein, said guide mechanism (1) is elongated with a substantially U-shaped cross-section, said U-shaped guide mechanism (1) has two sides each having an inner wall each defining an elongated first groove (11);

said sliding table (4) is slidably mounted in said U-shaped guide mechanism (1) between said inner walls of said two sides of said U-shaped guide mechanism (1), and has two sides each defining a second groove (41) mating with said first groove (11) of said U-shaped guide mechanism (1), a plurality of balls (32) inserted between said first groove (11) of said U-shaped guide mechanism (1) and said second groove (41) of said sliding table (4), said sliding table (4) having a front end and a rear end each provided with an end cap (3) for allowing circulating rolling of said balls (32) so that said sliding table (4) can move along said first groove (11) of said U-shaped guide mechanism (1);

said driving mechanism provides a power for movement of said sliding table (4); and said position measuring member has a ruler body mounted on an inner side of said U-shaped guide mechanism (1) such that said position measuring member has a function of detecting a position of said sliding table (4).

2. The measurable guide actuator in accordance with claim 1, wherein said position measuring member is a magnetic scale (2), and said magnetic scale (2) includes a ruler body (21) mounted on a bottom face of said inner side of said U-shaped guide mechanism (1), and a magnetic resistance sensor (22) sealed in said end cap (3).

3. The measurable guide actuator in accordance with claim 1, wherein said position measuring member is an optical scale, and said optical scale includes a ruler body bonded on a bottom face of said inner side of said U-shaped guide mechanism (1), and a optical sensor sealed in said end cap (3).

4. The measurable guide actuator in accordance with claim 1, wherein said driving mechanism is a ball screw (5), and said sliding table (4) is provided with a thread mating with that of said ball screw (5).

5. The measurable guide actuator in accordance with claim 1, wherein said driving mechanism is a timing belt (6), and said timing belt (6) is fixed on said sliding table (4) by a press board (61).

* * * * *